United States Patent
Diab

(10) Patent No.: US 9,105,377 B2
(45) Date of Patent: Aug. 11, 2015

(54) SYSTEM AND METHOD FOR ENHANCED AUTO-NEGOTIATION FOR NGBASE-T

(71) Applicant: Broadcom Corporation, Irvine, CA (US)

(72) Inventor: Wael William Diab, San Francisco, CA (US)

(73) Assignee: BROADCOM CORPORATION, Irvine, CA (US)

( * ) Notice: Subject to any disclaimer, the term of this patent is extended or adjusted under 35 U.S.C. 154(b) by 139 days.

(21) Appl. No.: 14/029,901

(22) Filed: Sep. 18, 2013

(65) Prior Publication Data

US 2014/0169386 A1 Jun. 19, 2014

Related U.S. Application Data

(60) Provisional application No. 61/725,998, filed on Nov. 13, 2012.

(51) Int. Cl.
| | |
|---|---|
| *H04L 12/24* | (2006.01) |
| *H04L 12/66* | (2006.01) |
| *H01B 11/06* | (2006.01) |
| *H04L 1/00* | (2006.01) |
| *H04L 12/403* | (2006.01) |
| *H04L 12/413* | (2006.01) |
| *H04L 5/14* | (2006.01) |
| *G06F 11/00* | (2006.01) |

(52) U.S. Cl.
CPC .............. *H01B 11/06* (2013.01); *H04L 1/0002* (2013.01); *H04L 5/1446* (2013.01); *H04L 12/403* (2013.01); *H04L 12/413* (2013.01)

(58) Field of Classification Search
CPC ............ H01R 13/6463; H04L 49/3054; H04L 49/352; H04L 69/24; H04L 29/06537
USPC .......................... 370/465, 437, 257, 463, 329
See application file for complete search history.

(56) References Cited

U.S. PATENT DOCUMENTS

| | | | | |
|---|---|---|---|---|
| 8,370,701 | B2 * | 2/2013 | Diab et al. | 714/753 |
| 8,724,464 | B2 * | 5/2014 | Diab | 370/235 |
| 2008/0225881 | A1 * | 9/2008 | Powell | 370/463 |
| 2009/0154491 | A1 * | 6/2009 | Diab | 370/465 |
| 2011/0026416 | A1 * | 2/2011 | Tazebay et al. | 370/252 |
| 2013/0265895 | A1 | 10/2013 | Diab et al. | |

\* cited by examiner

*Primary Examiner* — Charles C Jiang
*Assistant Examiner* — Will Lin
(74) *Attorney, Agent, or Firm* — Foley & Lardner LLP; Christopher J. McKenna; Daniel E. Rose

(57) ABSTRACT

A system and method for enhanced auto-negotiation for NGBASE-T. Link partners can be configured to exchange advanced NGBASE-T configuration information such as type, profile, capability and mode information of the PHY in one or more next page messages. Determined cabling parameters that are reflective of communication channel characteristics can be used in the auto-negotiation selection of a configuration for NGBASE-T operation.

20 Claims, 4 Drawing Sheets

| 0-10 | 11 | 12 | 13 | 14 | 15 |
|---|---|---|---|---|---|
| NGBASE-T Type/Profile/Capability/Mode Data Bits | Toggle | Ack2 | Message Page | Ack | Next Page |

*FIG. 2*

SYSTEM AND METHOD FOR ENHANCED AUTO-NEGOTIATION FOR NGBASE-T

This application claims priority to provisional application No. 61/725,998, filed Nov. 13, 2012, which is incorporated herein by reference in its entirety.

BACKGROUND

1. Field of the Invention

The present invention relates generally to networking and, more particularly, to a system and method for enhanced auto-negotiation for NGBASE-T.

2. Introduction

Management of an IT infrastructure is a key factor in the operation of any enterprise. For example, data centers have elevated in importance as their resilient operation is crucial to the delivery of services by the enterprise. Various initiatives such as energy efficiency, security and virtualization have become the focus of many efforts to improve the ability of the IT infrastructure to meet their performance objectives.

The IT infrastructure will continue to evolve as next-generation technologies are adopted for use in the enterprise environment. For example, higher bandwidth data links will continue to be introduced into the IT infrastructure to cope with the increased data needs of applications being supported by the enterprise.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 2 illustrates an example format of an unformatted next page message.

DETAILED DESCRIPTION

Figure 1:
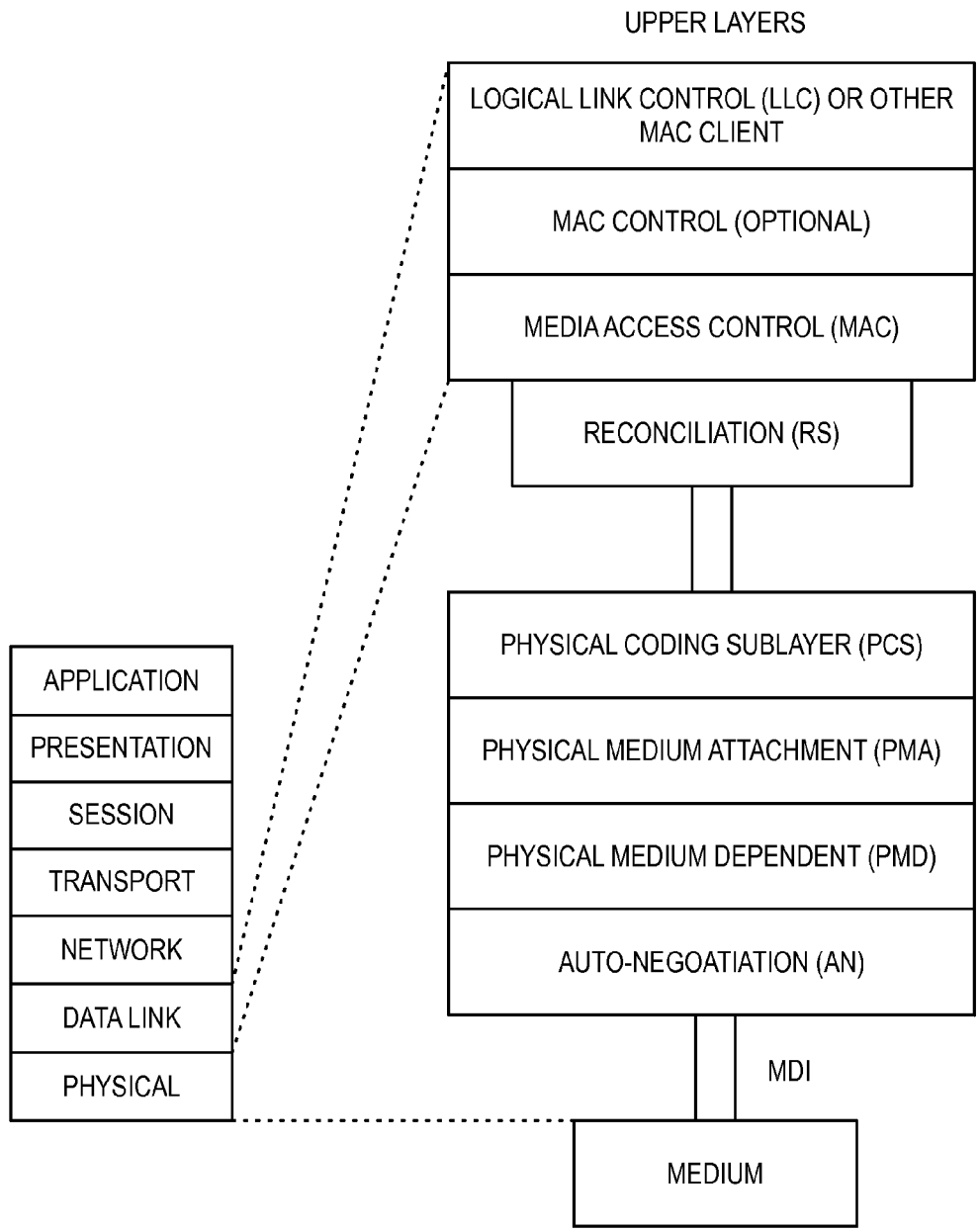
FIG. 1 illustrates an example of an Ethernet physical layer device (PHY) according to the present invention.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Next generation NGBASE-T devices (e.g., 10 GBASE-T, 40 GBASE-T, 100 GBASE-T, etc.) designed for communication over twisted pair Ethernet cabling can be designed to support multiple configurations. These multiple configurations can include, for example, support for operational distance limits that are less than a conventional operational distance limit of 100 meters.

Selection between the multiple configurations can be enabled through an enhanced auto-negotiation process. In one embodiment, an auto-negotiation process can include transmission, by a physical layer device, of first auto-negotiation information to a link partner device, the first auto-negotiation information including first physical layer device type information, the first physical layer device type information distinguishing between a first physical layer device type defined by a first link rate over a twisted pair network cable having a length up to a first operational distance limit, and a second physical layer device type defined by a second link rate over a twisted pair network cable having a length up to a second operational distance limit, the first operational distance limit being different from the second operational distance limit; reception, by the physical layer device, of second auto-negotiation information from the link partner device, the second auto-negotiation information including second physical layer device type information, the second physical layer device type information distinguishing between a third physical layer device type defined by a third link rate over a twisted pair network cable having a length up to a third operational distance limit, and a fourth physical layer device type defined by a fourth link rate over a twisted pair network cable having a length up to a fourth operational distance limit, the third operational distance limit being different from the fourth operational distance limit; and configuration of an operation of the physical layer device based on a comparison of the first auto-negotiation information and the second auto-negotiation information. In one example, the transmission of auto-negotiation information can be based on auto-negotiation next page messages. In another example, the transmission of auto-negotiation information can be based on physical signaling.

Previous generations of BASE-T communication were often defined by an operational distance limit of 100 meters. In general, it should be noted that a cabling specification represents a channel specification that is defined for a supported length of cabling (e.g., 100 meters) for a minimum category type (e.g., Category 3, 5, 5e, 6, 6A, 7, 7A, 8, etc.) of twisted pair cabling.

Many applications of next-generation NGBASE-T technology (e.g., 10G, 40G, 100G, etc.), on the other hand, do not require such an expansive operating range of cable length. For example, consider a data center application to which a physical layer device (PHY) could be applied. Today, Top-Of-Rack (TOR) and End-Of-Row (EOR) designs are common in data center topologies.

In the TOR design, servers connect to one or two Ethernet switches that are installed inside a rack enclosure. The TOR switch is typically a low profile unit (1RU-2RU) that enables all twisted pair copper cabling for the servers within the rack enclosure to stay within the rack. The cabling can therefore be short RJ45 patch cables (less than 10 meters) that connect the servers to the rack switch. The TOR Ethernet switch would then link the rack to aggregation switches in the data center network.

In the EOR design, racks that include a plurality of servers are lined up side by side in a row. At the end (or in the middle) of each row is a rack that includes switches that provide network connectivity to the servers within that row. Each server rack would have a bundle of twisted pair copper cabling that would be routed to the EOR switch rack. While the EOR server rack may not necessarily be located at the actual end of each row, the twisted pair copper cabling would represent at least a medium length span (e.g., 20-60 meters).

As these examples illustrate, a physical layer device (PHY) in a server or switch can be used with various types of network installations, many of which can be enabled by a narrower operational distance limit. As would be appreciated, the operational distance limit defined for a PHY can have a significant impact on the power, DSP, etc. requirements for the PHY. In the present invention it is recognized that numerous PHY types can be defined.

For example, various PHY types can be defined to support a short-range operation (e.g., up to 20 meters), a medium-range operation (e.g., 20-60 meters), a long-range operation (e.g., 60-100 meters), consumer-grade operation (e.g., up to 10 meters), etc. In the definition of such PHY types, specifications such as the speed of the PHY (e.g., 10G, 40G, 100G, etc.), the operational distance limit, the type of media needed, the number of wire pairs needed, the transmitter/receiver settings, the coding, signal constellation, etc. can be defined to suit the particular application. While the particular definitions of the PHY types would be implementation dependent, it is significant that the various PHY types are particularly defined to target various application scenarios. For example, a target application scenario of a home network would have vastly different requirements related to distance and performance as compared to a target application of an EOR link in a data center network. In general, the specialization of the PHY types provides greater flexibility in meeting the particular rate/distance requirements of a given application.

In consideration of the definition of various PHY types for next-generation NGBASE-T PHYs, it is recognized that an enhanced auto-negotiation process is needed. In this enhanced auto-negotiation process, differentiation between multiple configurations for a given link speed can be enabled that relate to different combinations of one or more of the operational distance limit, the type of media needed, the number of wire pairs needed, the transmitter/receiver settings, the coding, signal constellation, etc. In this context, it is recognized by the present invention that next generation NGBASE-T auto-negotiation need not be confined to a "one-size-fits-all" specification for a given link speed (e.g., 10G, 40G, 100G, etc.), Here, it is a feature of the present invention that an enhanced auto-negotiation process can be used to advertise type, profile, capability, and mode information between next-generation NGBASE-T link partners.

As noted above, type information can be used to represent a specification of a speed, operational distance limit, type of media needed, number of wire pairs, transmitter/receiver settings, coding, signal constellation, etc. of a PHY. Profile information for an NGBASE-T PHY can be used to represent settings within a particular PHY type. For example, where a range of settings are specified for a PHY type, the communication channel characteristics (e.g., Ethernet cable type, length, temperature, etc.) can be used to identify a particular setting (e.g., bias settings) within the range of settings for optimal operation of the PHY. Capability information for the PHY can be used to represent features supported by the PHY. For example, a PHY can support energy efficiency features (e.g., low power idle mode, subset PHY mode, or other form of subrating), cable diagnostic features, power scaling features that adjust transmit power based on link distance or insertion loss, etc. Finally, mode information for the PHY can be used to represent various operational modes. For example, a PHY can support a testing mode, symmetric/asymmetric operation modes, etc.

As would be appreciated, the particular type, profile, capability and mode information that can be defined for a next generation NGBASE-T PHY would be implementation dependent. What is significant is that the range of type, profile, capability and mode information has been expanded significantly as compared to previous PHY standards that are defined largely based on its link speed.

It is a feature of the present invention that an enhanced auto-negotiation process can be used to provide for the exchange of type, profile, capability and mode information between link partner devices. In one embodiment, the type, profile, capability and mode information for the NGBASE-T PHYs is exchanged using auto-negotiation next page message(s).

FIG. 1 illustrates an example of an Ethernet PHY according to the present invention that can be used to exchange type, profile, capability and mode information between link partner devices. In the illustrated example, the PHY can include a physical coding sublayer (PCS), a physical medium attachment (PMA), a physical media dependent (PMD), and auto-negotiation (AN). The PCS is generally responsible for encoding/decoding to/from code-groups for communication with the underlying PMA. In general, the PMA abstracts the PCS from the physical medium. Accordingly, the PCS can be unaware of the type of medium. The primary functions of the PMA include mapping of transmit and receive code-groups between the PCS and PMA, serialization/de-serialization of code-groups for transmission/reception on the underlying serial PMD, recovery of clock from the coded data (e.g., 8B/10B, 64B/66B, etc.) supplied by the PMD, and mapping of transmit and receive bits between the PMA and PMD. The PMD is generally responsible for generating electrical signals depending on the nature of the physical medium connected. PMD signals are sent to the medium dependent interface (MDI), which is the actual medium connected, including connectors, for the various media supported. In one embodiment, the PHY also includes one or more management registers that enables storage of one or more of type, profile, capability and mode information used by the auto-negotiation component of the PHY in the present invention.

In the auto-negotiation process, the auto-negotiation component of the PHY can be configured to transmit a base page followed by one or more next page messages. FIG. 2 illustrates an example format of an unformatted next page message according to the present invention. As illustrated, indications of the type, profile, capability and mode information of the PHY can be provided in bits 0-10 of the next page message. As would be appreciated, the specific mechanism by which bits 0-10 would be used to indicate type, profile, capability and mode information would be implementation dependent. Further, the amount of type, profile, capability and mode information being advertised can dictate the particular number of next page messages that are needed to advertise such information. In another embodiment, physical signaling can be used to enhance the auto-negotiation process.

In one example, bits 0-10 in one or more next page messages can be used to indicate one or more type information such as a specification of a speed, operational distance limit, type of media needed, number of wire pairs, transmitter/receiver settings, coding, signal constellation, etc. of a PHY. In another example, bits 0-10 in one or more next page messages can be used to represent settings within a particular PHY type. In another example, bits 0-10 in one or more next page messages can be used to represent features (e.g., energy efficiency features, cable diagnostic features, power scaling features, etc.) supported by the PHY. In yet another example, bits 0-10 in one or more next page messages can be used to represent various operational modes (e.g., testing mode, symmetric/asymmetric operation modes, etc.) for the PHY.

Regardless of the particular mechanism by which the exchange of type, profile, capability and mode information between NGBASE-T PHYs is facilitated, it is significant that the exchange enables the NGBASE-T PHYs to leverage newly-defined specifications that are targeted to a narrower application range. Without such an enhanced auto-negotiation process, operation would be limited to specifications that are overly-broad in their support of a range of applications. Less optimal operation of the NGBASE-T PHYs would therefore result.

Figure 3:
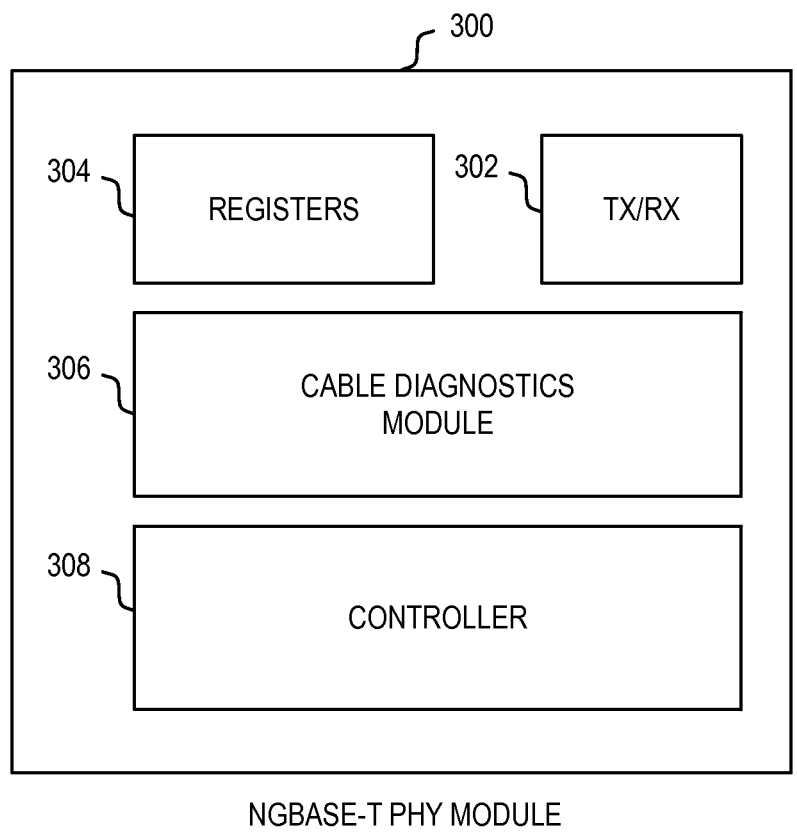
FIG. 3 illustrates an embodiment of a next generation NGBASE-T physical layer device.

As noted, variations in the communication channel (e.g., type of Ethernet cable, length of Ethernet cable, temperature of the Ethernet cable, etc.) can have an impact on the profile of the PHY. FIG. 3 illustrates an example embodiment of a next-generation NGBASE-T PHY that enables identification of the variations in the communication channel. As illustrated, PHY 300 includes transmit/receive (TX/RX) module 302, registers 304, cable diagnostic module 306, and controller 308.

In one embodiment, cable diagnostic module 306 can perform the cable diagnostics independently or in cooperation with an active data communication process that is occurring with a link partner device on the other end of the Ethernet cable. As would be appreciated, the specific mechanism and corresponding method by which cable diagnostic module 306 operates in the context of a cooperative cable diagnostic would be implementation dependent.

In general, cable diagnostics performed by cable diagnostics module 306 are performed under the control of controller 308. Cable diagnostics module 306 can be designed to generate and transmit a signal (e.g., pulses) into the Ethernet cable, and to measure a return or reflected signal received by TX/RX module 302. Signals received by TX/RX module 302 are then processed by cable diagnostic module 306 to determine various cabling parameters reflective of communication channel characteristics. The measurements taken by PHY module 300 can be stored in memory registers 304, which can be retrieved for use in the enhanced auto-negotiation process.

In one embodiment, the determined cabling parameters that are reflective of communication channel characteristics can be used in the configuration of the PHYs during auto-negotiation. For example, a determined length of the network cable can be used to select a PHY type (e.g., short-range operation, medium-range operation, long-range operation, consumer-grade operation, etc.). In another example, the determined type of network cable can be used to select a number of wire pairs, coding, signal constellation, etc. that are used by a configured PHY.

Here, it should be noted that the transmission of determined cabling parameters to the link partner during the auto-negotiation process can enable the link partner to perform a selection of a PHY type, profile, etc. whether or not the link partner possesses diagnostic capabilities within the PHY. In one embodiment, the determined cabling parameters can be used to restrict the auto-negotiation information that is transmitted to the link partner. For example, where the determined cabling parameters indicate that one or more PHY types are not supported by the attached network cable, the PHY can remove the non-supported PHY types from the auto-negotiation information that is transmitted to the link partner. This would obviate the need for consideration of an unsupported PHY type during auto-negotiation.

Figure 4:
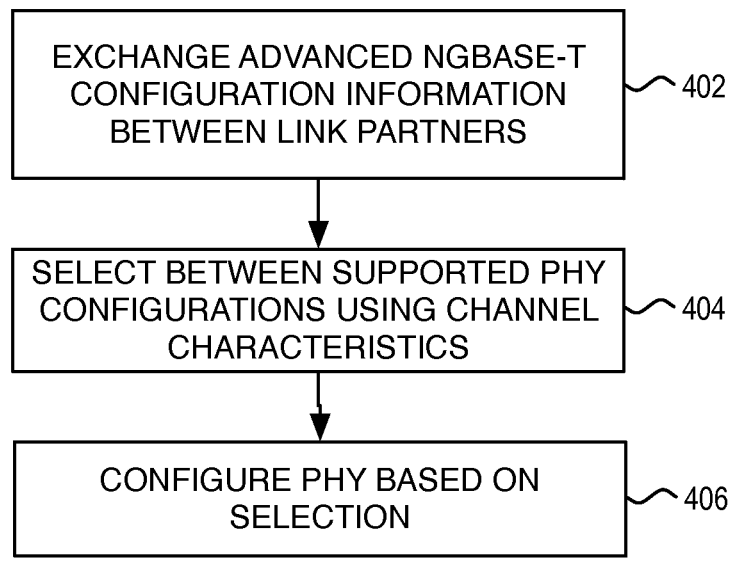
FIG. 4 illustrates an example flowchart of a process of the present invention.

Having described a framework that supports enhanced auto-negotiation, reference is now made to the flowchart of FIG. 4, which illustrates an example process of the present invention. As illustrated, the process begins at step 402 where link partners exchange advanced NGBASE-T configuration information. In one embodiment, link partners can be configured to exchange one or more of type, profile, capability and mode information of the PHY in one or more next page messages. In one embodiment, one or more of the type, profile, capability and mode information of the PHY is retrieved from one or more management registers in the PHY. In one example, determined cabling parameters that are reflective of communication channel characteristics are stored in the one or more management registers based on measurements performed using a cable diagnostics module within the PHY.

At step 404, the determined cabling parameters that are reflective of communication channel characteristics can then be used to select between supported PHY types. In various embodiments, the selection between supported PHY configuration can relate to types, profiles, etc. of the PHY. For example, a determined length or type of network cable can be used to select between different supported PHY configurations. After the selection is completed, the auto-negotiation process can then result in a configuration of a PHY based on the selection at step 406.

In general, the exchange of advanced NGBASE-T configuration information enables an expansion of the potential configurations of an NGBASE-T PHY to target specific application scenarios. These potential configurations can represent optimizations that would otherwise be eliminated should a single all-encompassing PHY configuration be defined for general use in all potential applications.

As would be appreciated, the principles of the present invention can be used with various port types (e.g., backplane, twisted pair, optical, etc.) as well as standard or non-standard (e.g., 2.5G, 5G, 10G, 20G, 25G, 28G, 40G, 100G, etc.) link rates, as well as future link rates (e.g., 400G, etc.). The principles of the present invention can also be applied to an asymmetric configuration of the link.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An auto-negotiation method, comprising:
transmitting, by a physical layer device, first auto-negotiation information to a link partner device, the first auto-negotiation information including first physical layer device type information, the first physical layer device type information distinguishing between a first physical layer device type defined by a first link rate over a twisted pair network cable having a length up to a first operational distance limit, and a second physical layer device type defined by a second link rate over a twisted pair network cable having a length up to a second operational distance limit, the first operational distance limit being different from the second operational distance limit;
receiving, by the physical layer device, second auto-negotiation information from the link partner device, the second auto-negotiation information including second physical layer device type information, the second physical layer device type information distinguishing between a third physical layer device type defined by a third link rate over a twisted pair network cable having a length up to a third operational distance limit, and a fourth physical layer device type defined by a fourth link rate over a twisted pair network cable having a length up to a fourth operational distance limit, the third operational distance limit being different from the fourth operational distance limit; and configuring an operation of the physical layer device based on a comparison of the first auto-negotiation information and the second auto-negotiation information.

2. The method of claim 1, wherein the first physical layer device type defines a first type of coding and transmitter/receiver settings, and the second physical layer device type defines a second type of coding and transmitter/receiver settings that are different from the first type.

3. The method of claim 1, wherein the first auto-negotiation information further includes profile information that is based on communication channel characteristics.

4. The method of claim 1, wherein the first auto-negotiation information further includes capability information.

5. The method of claim 4, wherein the capability information includes support for energy efficiency operation.

6. The method of claim 4, wherein the capability information includes support for cable diagnostics.

7. The method of claim 1, wherein the first auto-negotiation information further includes mode information.

8. The method of claim 7, wherein the mode information includes symmetric or asymmetric mode information.

9. The method of claim 1, wherein the first auto-negotiation information is transmitted using one or more auto-negotiation next page messages.

10. The method of claim 1, wherein the first auto-negotiation information is transmitted using physical layer signaling.

11. An auto-negotiation method, comprising:
receiving, by a first physical layer device during an auto-negotiation process, auto-negotiation information from a link partner device, the auto-negotiation information including physical layer device type information, the physical layer device type information distinguishing between a first physical layer device type defined by a first link rate over a twisted pair network cable having a length up to a first operational distance limit, and a second physical layer device type defined by a second link rate over a twisted pair network cable having a length up to a second operational distance limit, the first operational distance limit being different from the second operational distance limit;
selecting between the first physical layer device type and second physical layer device type based on characteristics of a communication channel that is exchanged between the first physical layer device and a second physical layer device in a link partner during the auto-negotiation process; and
configuring an operation of the first physical layer device based on the selection of one of the first physical layer device type and second physical layer device type.

12. The method of claim 11, wherein the first link rate is the same as the second link rate.

13. The method of claim 11, wherein the characteristics of the communication channel are measured by the first physical layer device.

14. The method of claim 11, wherein the characteristics of the communication channel are measured by the second physical layer device.

15. The method of claim 11, wherein the characteristics of the communication channel includes a length of the twisted pair network cable.

16. The method of claim 11, wherein the characteristics of the communication channel includes a category type of the twisted pair network cable.

17. An auto-negotiation method, comprising:
exchanging, during an auto-negotiation process, auto-negotiation information between a first physical layer device and a second physical layer device, the auto-negotiation information including physical layer device type information, the physical layer device type information distinguishing between a first physical layer device type defined by a first link rate over a twisted pair network cable having a length up to a first operational distance limit, and a second physical layer device type defined by a second link rate over a twisted pair network cable having a length up to a second operational distance limit, the first operational distance limit being different from the second operational distance limit;
receiving, by the first physical layer device during the auto-negotiation process, characteristics of a communication channel between the first physical layer device and the second physical layer device; and
selecting, by the first physical layer device during the auto-negotiation process, one of the first physical layer device type and second physical layer device type using the received characteristics of the communication channel.

18. The method of claim 17, wherein the first link rate is the same as the second link rate.

19. The method of claim 17, wherein the characteristics of the communication channel includes a length of the twisted pair network cable.

20. The method of claim 17, wherein the characteristics of the communication channel includes a category type of the twisted pair network cable.

* * * * *